F. V. ELBERTZ.
DIFFERENTIAL GEARING.
APPLICATION FILED MAR. 19, 1920.
1,409,535.
Patented Mar. 14, 1922.
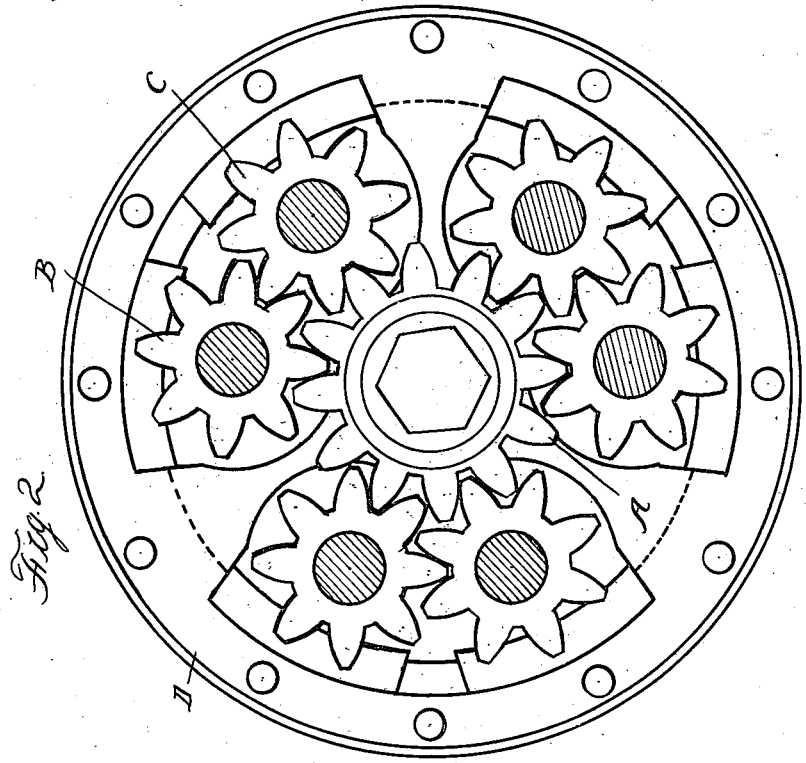
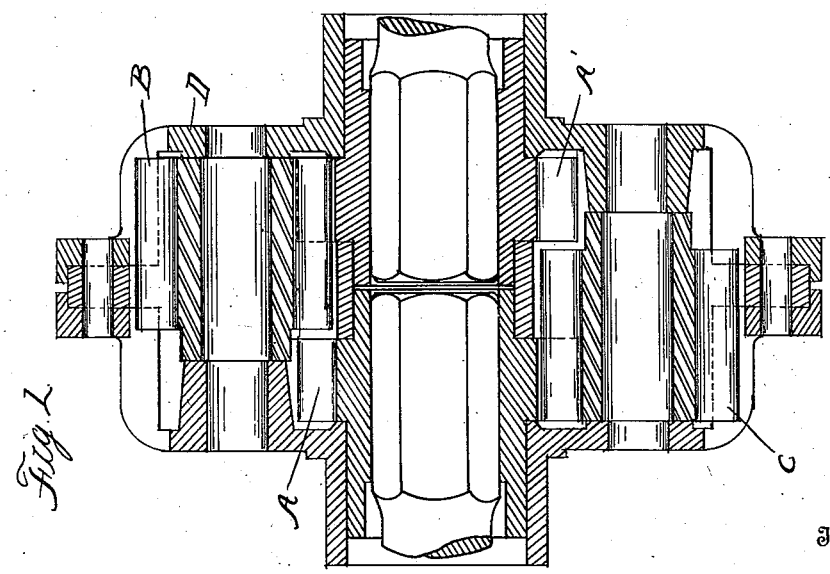
Inventor
FRANK V. ELBERTZ
By Whittemore Hulbert & Whittemore
Attorneys

UNITED STATES PATENT OFFICE.

FRANK V. ELBERTZ, OF KOKOMO, INDIANA, ASSIGNOR OF ONE-FOURTH TO ANDREW BACHLE, OF DETROIT, MICHIGAN.

DIFFERENTIAL GEARING.

1,409,535. Specification of Letters Patent. Patented Mar. 14, 1922.

Application filed March 19, 1920. Serial No. 367,051.

*To all whom it may concern:*

Be it known that I, FRANK V. ELBERTZ, a citizen of the United States of America, residing at Kokomo, in the county of Howard and State of Indiana, have invented certain new and useful Improvements in Differential Gearing, of which the following is a specification, reference being had therein to the accompanying drawing.

The invention relates to differential gearings of that type in which the leverage ratios are variable in different positions of adjustment, so as to transmit either the same or different amounts of power to each of the driven members. The invention consists in the peculiar construction and arrangement of parts as hereinafter set forth.

In the drawings:

Figure 1 is a central longitudinal section and Figure 2 is an elevation with part of the casing removed.

A and A' are the driven gears of the differential, which are arranged in axial alignment with each other and are adapted for connection with the driven shafts by a spline engagement, or otherwise. The gears A and A' are spur gears having teeth of such dimensions as to produce a considerable variation in the leverage between the root and crown portions of the tooth. B and C are spur pinions having similar involute teeth, said pinions being respectively in mesh with the gears A and A' and being of such length as to have overlapping portions in mesh with each other. As shown, there are three sets of pinions B and C arranged at equal intervals around the periphery of the gear wheels A and A', and these pinions are journaled in a suitable carrier frame D, which is revoluble about the axis of the gears A and A' and constitutes the driver for the differential.

With the construction as described, the ratio between the gears and pinions and their relative arrangement is such that in one position of adjustment, the ratio between the gear wheel A and pinion B is equal to the ratio between the gear wheel A' and the pinion C, while the pinions B and C stand in a one-to-one ratio. In this position, all of the teeth are in contact with the cooperating teeth at a point midway between the crown and root of each. In another position of adjustment the gear wheel A' will have the root of one of its teeth in engagement with the crown of one of the teeth of the pinion B, and also the root of a tooth on the pinion B will be in engagement with the crown of a tooth on the pinion C, while the crown of a tooth in the gear wheel A' will be in engagement with the root of a tooth in the pinion C. This will materially alter the leverage ratios so that more power will be transmitted to the gear wheel A' than is transmitted to the gear wheel A. A further adjustment will produce the reverse condition where the crown of a tooth in the gear wheel A will be in engagement with the root of a tooth in the pinion B, the crown of a tooth B in engagement with the root of a tooth in the pinion C, and the root of a tooth in the gear wheel A' in engagement with the crown of a tooth in the pinion C. This will just reverse the leverage ratios, transmitting more power to the gear wheel than to the gear wheel A'.

What I claim as my invention is:

1. A variable leverage differential gearing comprising a pair of driven gear wheels in axial alignment and spaced from each other, a pair of pinions respectively in mesh with said gear wheels and overlapping and in mesh with each other, the teeth on all of said gears and pinions being of such form and so arranged that in one position of relative adjustment all of the teeth are in central engagement with each other, so that the leverage is the same between the pinions and each of the driven gears and in other positions of adjustment the leverage ratios are varied between the extremes where the root of one gear is in engagement with the crown of the intermeshing gear and so on throughout the series, or the crown of said first-mentioned gear is in engagement with the root of the intermeshing gear and so on throughout the series, 2. A variable leverage differential gearing comprising a pair of spur gears in axial alignment and spaced from each other, pinions in mesh with the respective spur gears and of such length as to have overlapping portions in mesh with each other, the teeth of all of said gears and pinions being of such form and of such a length as to appreciably vary the leverage ratios between the extreme positions where the root of one tooth engages the crown of the intermeshing tooth and where the crown of the first mentioned tooth engages the root of the second-mentioned tooth, the proportion and arrangement being such as to produce accumulating variation throughout the train from a position where the ratios are equal between the pinions and each of the gears to the positions where the power transmitted to one or the other of the gears is in excess of that transmitted to the companion gear.

3. A variable leverage differential gearing, comprising the driving member and a plurality of driven members, differential gear trains between the drive and driven members, each comprising a plurality of pairs of intermeshing gears, the teeth on each pair of gears being constructed to vary the lever ratios therebetween in different positions of adjustment and all of said pairs being arranged to produce cumulative variation in ratios between the drive and driven members from one extreme to the other extreme of adjustment.

In testimony whereof I affix my signature.

FRANK V. ELBERTZ.